United States Patent
Fukui

[15] 3,687,925
[45] Aug. 29, 1972

[54] PROCESS FOR THE PREPARATION OF IMPROVED CIS-1,4-POLYISOPRENE

[72] Inventor: Toshio Fukui, Kamakura, Japan
[73] Assignee: The Japanese Geon Company, Ltd., Tokyo, Japan
[22] Filed: July 27, 1970
[21] Appl. No.: 58,225

[30] Foreign Application Priority Data
July 29, 1969   Japan......................44/59329

[52] U.S. Cl................................260/94.3, 260/82.1
[51] Int. Cl............C08d 1/14, C08d 3/02, C08d 3/10
[58] Field of Search............................260/94.3, 82.1

[56] References Cited
UNITED STATES PATENTS
3,177,183   4/1965   Naylor.....................260/82.1
3,220,999   11/1965  Duck et al................260/94.3

Primary Examiner—Joseph L. Schofer
Assistant Examiner—Richard A. Gaither
Attorney—Sherman and Shalloway

[57] ABSTRACT

In the process for the preparation of cis-1,4-polyisoprene by polymerizing isoprene by use of a catalyst composed essentially of an organoaluminum compound and a titanium tetrahalide, an improvement wherein a compound having two independent conjugate diene groups is present in the polymerization system in an amount of up to 5 parts by weight per 100 parts by weight of the isoprene.

8 Claims, 1 Drawing Figure

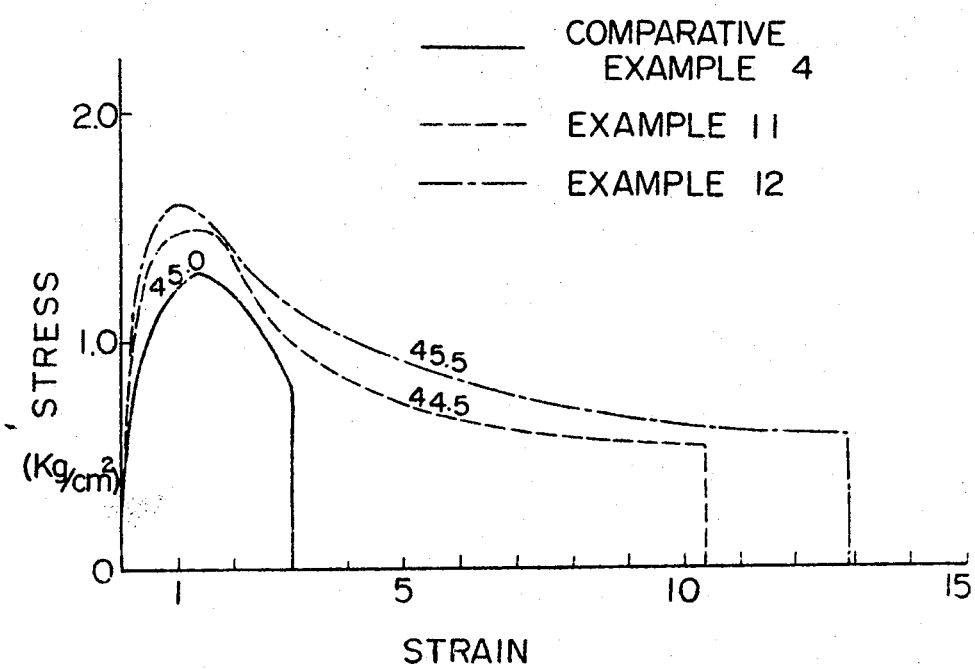

PROCESS FOR THE PREPARATION OF IMPROVED CIS-1,4-POLYISOPRENE

This invention relates to a process for the preparation of cis-1,4-polyisoprene. More particularly, the invention relates to a process for the preparation of cis-1,4-polyisoprene having improved green strength and modulus by use of a catalyst composed essentially of an organo-aluminum compound and a titanium tetrahalide, wherein a compound having two independent conjugate diene groups is present in the polymerization system in an amount of up to 5 parts by weight per 100 parts by weight of the isoprene.

It has been well known that when isoprene is polymerized in the presence of a catalyst composed essentially of a trialkylaluminum and titanium tetrachloride, a polyisoprene of a high cis-1,4 content is formed. The structure and composition of the so formed polyisoprene are quite similar to those of natural Hevea rubber and the physical properties are also quite similar, but the above polyisoprene is inferior to natural rubber in the green strength, and, accordingly, it has defects such as poor processability and low modulus. Many attempts have been heretofore made to improve these defects of cis-1,4-polyisoprene. For instance, the preparation of higher molecular weight polymers has been proposed. Since in the polymerization of isoprene by use of a catalyst composed essentially of a trialkylaluminum and titanium tetrachloride the molecular weight of the resulting polymer may be changed by varying the polymerization conditions such as polymerization temperature, composition of the catalyst components, catalyst concentration and polymerization solvent, it is possible to obtain cis-1,4-polyisoprene having a higher molecular weight by changing such polymerization conditions. However, as the polymerization rate, the microstructure of the polymer and the like are also changed at the same time, the range within which the molecular weight may be adjusted is very restricted and it is difficult to greatly increase the molecular weight without inviting other disadvantages according to this proposal. Thus there has been also proposed a method comprising adding to the polymerization system an arylazo compound, an arylhydrazo compound, a halogenated alkyl compound, silicon tetrachloride, phosphorus tetrachloride or other compound.

The primary object of this invention is to provide a process for the preparation of cis-1,4-polyisoprene having improved green strength and modulus by a novel technique quite different from conventional techniques of increasing the molecular weight.

Other objects and advantages of this invention will be apparent from the description given hereinbelow.

It has been found that in the preparation of cis-1,4-polyisoprene by polymerizing isoprene in the presence of a catalyst composed essentially of a trialkylaluminum and a titanium tetrahalide, polyisoprene having a high Mooney viscosity can be obtained without changing the polymerization rate and the cis-1,4 content if a small amount of a hydrocarbon compound having two independent conjugate diene groups, represented by the formula $$CHX=C-CX=CHX$$
$$\underset{R}{|}$$
$$CHX=C-CX=CHX \quad (I)$$

$$CHX=C-CX=CHX$$
$$\underset{R}{|}$$
$$CH=CX-CX=CHX \quad (II)$$

or $$CHX=CX-CX=CH-R-CH=CX-CX=CHX \quad (III)$$

wherein R stands for an aliphatic residue, an alicyclic residue, an aromatic residue or an aromatic aliphatic residue, particularly preferably a saturated aliphatic residue, each having one to 10 carbon atoms, and X stands for hydrogen atom or methyl group is present in the system.

It has also been found that the green strength and modulus of the so obtained polyisoprene are superior to those of conventional polyisoprene.

In the above-mentioned process of this invention, the Mooney viscosity of the resulting polyisoprene may be varied by changing the amount of the above-mentioned hydrocarbon compound added under industrially advantageous conditions, namely under suitable conditions of solvent, monomer concentration, catalyst amount, polymerization temperature and the like, and if other conditions are fixed, the increase of the amount of the hydrocarbon compound added results in increase of the Mooney viscosity. In the art of the polymerization of vinyl compounds with use of a peroxide catalyst it is well known to add a small amount of a compound having two or more vinyl groups to the polymerization system for the purpose of increasing the molecular weight of the resulting polymer. In the process of this invention, however, the objects cannot be attained by employing compounds having two vinyl groups, such as 1,5-hexadiene and divinyl benzene. In the process of this invention it is indispensable that the above-mentioned hydrocarbon compound having two independent conjugate diene groups is added to the polymerization system.

The accompanying drawings illustrate the increase of the green strength of polyisoprene produced in accordance with the process of this invention, in which figures on each curve denote values of the Mooney viscosity ($ML_{1+4}/100°$ C.) of the compounded rubber of each sample.

As the hydrocarbon compound having two independent conjugate diene groups to be used in this invention, there may be cited 3,6-dimethylene-1,7-octadiene, 3,11-dimethylene-1,12-tridecadiene, 1,3,7,9-decatetraene, 2,7-dimethyl-3,6-dimethylene-1,7-octadiene, 4,7-dimethylene-2,8-decadiene, 1,3,9,11-dodecatetraene, 2,4,8,10-dodecatetraene, 2,9-dimethyl-1,3,7,9-decatetraene, 3-methylene-1,5,7-octatriene, 4-methylene-2,6,8-nonatriene, 2-methyl-3-methylene-1,5,7-octatriene and the like. These hydrocarbon compounds are present in the polymerization system in an amount of up to 5 parts by weight per 100 parts by weight of isoprene, preferably in an amount of 0.005 to 1.0 part by weight. In case the amount of the hydrocarbon compound exceeds 5 parts by weight, the resulting polymer does not possess properties as elastomer and is not usable as ordinary rubber. Such hydrocarbon compound may be present in the system from the initiation of the polymerization or may be added to the polymerization system in the midway of the polymerization. In each case, the presence of such hydrocarbon compound attains a subsidiary effect that the viscosity of the polymerization solution is lowered.

The catalyst to be used in this invention is a Ziegler catalyst composed essentially of (A) an organoaluminum compound expressed by the general formula

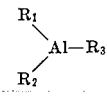

wherein $R_1$ is selected from the group consisting of hydrogen, halogens, alkyl groups, cycloalkyl groups, aryl groups and aralkyl groups, and $R_2$ and $R_3$ each are selected from the group consisting of alkyl groups, cycloalkyl groups, aryl groups and aralkyl groups, and (B) a titanium halide. But the catalyst may contain, in addition to the above two components, a Lewis base as a third component, such as non-polymerizable ethers and amines.

As the organoaluminum compound, trialkyl aluminum compounds such as triethyl aluminum, tri-isobutyl aluminum and trihexyl aluminum; tricycloalkyl aluminum compounds such as tricyclopentyl aluminum and tricyclohexyl aluminum; triaryl aluminum compounds such as triphenyl aluminum, tri-o-tolyl aluminum, tri-m-tolyl aluminum and tri-p-tolyl aluminum; triaralkyl aluminum compounds such as tribenzyl aluminum; and diethyl aluminum halides such as diethyl aluminum chloride may be cited.

As the above-mentioned titanium tetrahalide there may be exemplified titanium tetrafluoride, titanium tetrachloride, titanium tetrabromide, titanium tetraiodide and mixtures thereof.

Aliphatic ethers, aromatic ethers, aliphatic-aromatic mixed ethers and cyclic ethers of various types may be used as the third component of the catalyst. Examples of such ethers are dimethyl ether, diethyl ether, di-n-butyl ether, diphenyl ether, anilyl, styrene oxide, furan and tetrahydrofuran. As amine there may be optionally used primary, secondary and tertiary amines having an alkyl group of less than 18 carbon atoms, such as methyl amine, dimethyl amine, trimethyl amine, diethyl amine, triethyl amine and tripropyl amine; primary, secondary and tertiary aryl or aralkyl amines such as phenyl amine, diphenyl amine, triphenyl amine and tribenzyl amine; alicyclic amines such as cyclohexyl amine; and heterocyclic amines such as pyridine, N-ethyl piperidine and pyrrole.

An organic hydrocarbon compound inert to the polymerization system is used as a solvent for the polymerization. As such solvent there may be cited aliphatic hydrocarbons such as n-butane, n-pentane, n-hexane and n-heptane; alicyclic hydrocarbons such as cyclohexane; aromatic hydrocarbons such as benzene and toluene; saturated halogenated hydrocarbons such as ethylene dichloride; and mixtures of two or more of the above hydrocarbons.

The catalyst to be used in conducting the process of this invention is very sensitive to oxygen, water and the like. They adversely affect the activity of the catalyst. Accordingly, it is necessary to remove oxygen and water from the monomer, the inert solvent and the hydrocarbon compound having two independent conjugate diene groups present in the polymerization system.

The polymerization is effected by mixing prescribed amounts of the titanium tetrahalide and organoaluminum compound (a Lewis base may be added thereto as third component) and then adding the resulting catalyst suspension to the polymerization system. In this case, the proportions of the titanium tetrahalide and organoaluminum compound are such that the Al/Ti molar ratio is within a range of from 0.5 to 3.0, preferably 0.7 to 1.5. Preferable amounts of the catalyst added are such that the titanium tetrahalide is present in an amount of 0.1 to 20 m.moles per mole of the monomer. The concentration of the monomer is 5 – 100 percent by weight, preferably 10 – 40 percent by weight. It is preferable that the polymerization is carried out at a temperature ranging from $-5°C$ to $70°C$.

This invention will now be described by referring to examples.

EXAMPLES 1 TO 6 AND COMPARATIVE EXAMPLES

A hydrocarbon compound having two independent conjugate diene groups was synthesized in the following manner:

A 1-liter capacity three-neck flask equipped with a stirrer, a dropping funnel and a reflux cooler was charged with 12.2 g of magnesium piece, 100 ml of dried ether and 1.0 g of ethyl bromide, and the mixture was heated. Coincidentally with initiation of the reaction, a solution of 82.5 g 2-chloromethyl-1,3-butadiene in 400 ml of dried ether was added dropwise to the reaction mixture. The resultant precipitate was dissolved in hydrochloric acid, extracted with ether and dried. Some 22.5 g of 3,6-dimethylene-1,7-octadiene were obtained.

When the above run was repeated by employing 5-chloro-1,3-pentadiene as the starting compound, 1,3,7,9decatetraene was obtained. Similarly, 2,4,8,10-dodecatetraene was obtained from 1-chloro-2,4-hexadiene, and 3-methylene-1,5,7-octatriene was obtained from 2-chloromethyl-1,3-butadiene and 1-chloro-1,3-butadiene.

Cis-1,4-polyisoprene was prepared in the following manner:

A pressure-resistant glass reactor having an inner capacity of 1 liter was washed and dried, and the inner atmosphere of the reactor was completely replaced by nitrogen. Then the reactor was charged with 395 g of n-hexane, 70 g of isoprene and a variable amount, as indicated in Table 1, of 3,6-dimethylene-1,7-octadiene. Separately, a flask of an inner capacity of 200 ml was washed and dried, and the inner atmosphere of the flask was completely replaced by nitrogen. Then the flask was charged with 80 ml of a solution of titanium tetrachloride in n-hexane (concentration = 0.3125 mole/liter), and 19.2 ml of a solution of tri-isobutyl aluminum in n-hexane (concentration = 1.25 moles/liter) and 5 m. moles of di-n-butyl ether were gradually added to the titanium tetrachloride solution. A solution of brown precipitates (the Al/Ti/ether molar ratio = 1.0/1.0/0.2; the titanium tetrachloride concentration = 0.25 mole/liter) was obtained. The solution was added to the above-mentioned pressure-resistant glass reactor in such an amount that the titanium concentration would be 1.0 m. mole per mole of isoprene. The polymerization was carried out at 30° C. for 1 hour. After termination of the polymerization, the content of the reactor was taken into 2 percent by weight solution of phenyl-beta-naphthyl amine in methanol to thereby coagulate the resulting polymer, which was then dried at 70° C. under reduced pressure. Then the yield, gel content, Mooney viscosity and cis-1,4 content of the product were determined. The determination of the cis-1,4 content was conducted in accordance with infra-red spectral analysis. The gel content was determined by taking 0.2 g of the sample polymer in a wire netting of 80 mesh, dissolving the sample in 50 ml of toluene for 24 hours and then measuring the weight of the insoluble portion. Results are shown in Table 1.

Table 1

|  | Comparative Ex. 1 | Example No. 1 | 2 | 3 | 4 | 5 | 6 |
|---|---|---|---|---|---|---|---|
| Isoprene (g) | 70 | 70 | 70 | 70 | 70 | 70 | 70 |
| n-Hexane (g) | 395 | 395 | 395 | 395 | 395 | 395 | 395 |
| 3,6-Dimethylene-1,7-octadiene (g) | — | 0.007 | 0.035 | 0.07 | 0.35 | 0.7 | 3.5 |
| 3,6-Dimethylene-1,7-octadiene (part by weight) per 100 parts by weight of isoprene | — | 0.01 | 0.05 | 0.1 | 0.5 | 1.0 | 5.0 |
| Yield (%) | 61.2 | 63.0 | 56.8 | 54.0 | 50.3 | 41.0 | 16.8 |
| Gel content (%) | 8.4 | 8.0 | 12.3 | 18.5 | 39.6 | 51.4 | 86.0 |
| Cis-1,4 content (%) | 98.4 | 98.4 | 98.4 | 98.3 | 98.2 | 97.8 | 97.0 |
| $ML_{1+4}/100°C$. | 91.0 | 95.5 | 106.0 | 112.0 | 119.0 | 122.0 125.0 |  |
| Cement viscosity (CP) | 9000 | 6500 | 3200 | 1800 | 950 | 600 | 200 |

From the results shown in Table 1 it can be seen that the Mooney viscosity, gel content and cement viscosity may be varied by changing the amount of 3,6-dimethylene-1,7-octadiene added.

EXAMPLES 7 AND 8

The polymerization of isoprene was effected under the same conditions as in Examples 1 to 6 by employing 1,3,7,9-decatetraene, 2,4,8,10-dodecatetraene or 3-methylene-1,5,7-octatrine instead of 3,6-dimethylene-1,7-octadiene. The results are shown in Table 2.

Table 2

|  | Comparative Ex. 1 | Example No. 7 | 8 | 9 | 10 | 11 |
|---|---|---|---|---|---|---|
| Isoprene (g) | 70 | 70 | 70 | 70 | 70 | 70 |
| n-Hexane (g) | 395 | 395 | 395 | 395 | 395 | 395 |
| 1,3,7,9-Decatetraene (g) | — | 0.07 | 0.21 | — | — | — |
| 1,3,7,9-Decatetraene (parts by weight) per 100 parts by weight of isoprene | — | 0.1 | 0.3 | — | — | — |
| 2,4,8,10-Dodecatetraene (g) | — | — | — | 0.07 | 0.21 | — |
| 2,4,8,10-Dodecatetraene (parts by weight) per 100 parts by weight of isoprene | — | — | — | 0.1 | 0.3 | — |
| 3-Methylene-1,5,7-octatriene (g) | — | — | — | — | — | 0.07 |
| 3-Methylene-1,5,7-octatriene (parts by weight) per 100 parts by weight of isoprene | — | — | — | — | — | 0.1 |
| Yield (%) | 61.2 | 64.2 | 61.4 | 60.5 | 51.3 | 59.7 |
| Gel content (%) | 8.4 | 8.2 | 30.7 | 8.7 | 32.0 | 9.0 |
| Cis-1,4 content (%) | 98.4 | 98.2 | 98.3 | 98.4 | 98.3 | 98.3 |
| $ML_{1+4}/100°C$. | 91.0 | 99.8 | 110.2 | 103.0 | 112.5 | 101.5 |

COMPARATIVE EXAMPLES 2 AND 3

The polymerization of isoprene was carried out in the same manner as in Examples 1 to 6 by employing, instead of 3,6-dimethylene-1,7-octadiene, 1,5-hexadiene having two vinyl groups. The results are shown in Table 3.

Table 3

|  | Comparative Example No. 1 | 2 | 3 |
|---|---|---|---|
| Isoprene (g) | 70 | 70 | 70 |
| n-Hexane (g) | 395 | 395 | 395 |
| 1,5-Hexadiene (g) | — | 0.07 | 0.21 |
| 1,5-Hexadiene (parts by weight) per 100 parts by weight of isoprene | — | 0.1 | 0.3 |
| Yield (%) | 61.2 | 40.0 | 29.5 |
| Gel content (%) | 8.4 | 9.0 | 9.2 |
| Cis-1,4 content (%) | 98.4 | 98.4 | 98.3 |
| $ML_{1+4}/100°C$. | 91.0 | 90.0 | 90.5 |

From the results shown in Table 3, it can be seen that the presence of a compound having two vinyl groups does not increase the Mooney viscosity of polyisoprene but brings about a demerit that the polymerization rate is lowered.

EXAMPLES 12 and 13 AND COMPARATIVE EXAMPLE 4

The polymerization of isoprene was conducted in the same manner as in Examples 1 to 6 by employing a stainless steel polymerization vessel of a capacity of 50 liters. The resulting polymer was blended with additives shown in Table 4 and the Mooney viscosity of the compounded rubber was made constant by mastication. Then, the green strength of the compounded rubber was measured. Results are shown in the accompanying drawings.

Table 4

| Polyisoprene | 100 parts by weight |
| Stearic acid | 1.0 part by weight |
| Zinc flower (No. 1) | 3.0 parts by weight |
| Sulfur (0325) | 2.5 parts by weight |
| Nocceler DM *¹ | 1.0 part by weight |
| Acting B *² | |

*¹ vulcanization promoter manufactured by Ohuchi Shinko K.K.
*² vulcanization promoter manufactured by Yoshitomi Seiyaku K.K.

The compounded rubber was vulcanized at 140° C. for 40 minutes and the physical properties of the vulcanized product were determined. Results are shown in Table 5.

Table 5

|  | Comparative Ex. 4 | Ex. 12 | Ex. 13 |
| --- | --- | --- | --- |
| Isoprene (kg) | 4.9 | 4.9 | 4.9 |
| n-Hexane (kg) | 27.65 | 27.65 | 27.65 |
| 3,6-Diemethylene-1,7-octadiene (g) | — | 1.47 | 14.70 |
| 3,6-Diethyl-ethylene-1,7-octadiene (parts by weight) per 100 parts by weight of isoprene | — | 0.03 | 0.3 |
| Yield (%) | 60.3 | 59.3 | 53.9 |
| Gel content (%) | 5.4 | 5.3 | 33.8 |
| Cis-1,4 content (%) | 98.3 | 98.4 | 98.2 |
| Monney viscosity of polyisoprene ($ML_{1+4}/100°C.$) | 101.0 | 115.5 | 120.0 |
| Monney viscosity of compounded rubber ($ML_{1+4}/100°C.$) | 45.0 | 44.5 | 45.5 |
| Strength at breakage (kg/cm²) | 259 | 254 | 247 |
| Elongation (%) | 800 | 780 | 770 |
| Modulus (300%) (kg/cm²) | 17 | 18 | 19 |
| Modulus (500%) (kg/cm²) | 28 | 37 | 41 |
| Tear strength (kg/cm) | 41 | 41 | 37 |
| Repulsive elasticity (%) | 79.0 | 79.5 | 77.8 |
| Permanent compression distortion (%) | 26.2 | 25.2 | 26.1 |

What we claim is:

1. In a process for the preparation of cis-1,4-polyisoprene by polymerizing isoprene with a catalyst consisting essentially of an organoaluminum compound of the formula:

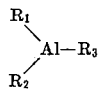

wherein $R_1$ is selected from hydrogen, halogens, alkyl groups, cycloalkyl groups, aryl groups and aralkyl groups, and $R_2$ and $R_3$ are each selected from alkyl groups, cycloalkyl groups, aryl groups and aralkyl groups, and a titanium tetrahalide, the improvement wherein a compound having two independent conjugate diene groups selected from i. compounds of the formula:

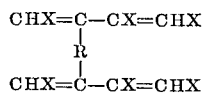

wherein R represents an aliphatic residue, an alicyclic residue, an aromatic residue or an aromatic aliphatic residue, each having one to 10 carbon atoms, and X represents a hydrogen atom or methyl group;

ii. compounds of the formula:

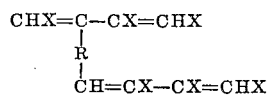

wherein R and X are as defined above; and iii. compounds of the formula:

$$CHX = CX - CX = CH - R - CH = CX - CX = CHX$$

wherein R and X are as defined above; is present in the polymerization system in an amount of up to 5 parts by weight per 100 parts by weight of isoprene.

2. The improvement of claim 1 wherein said polymerization catalyst is obtained by mixing said organoaluminum compound and said titanium tetrahalide in such proportions that the Al/Ti molar ratio is in the range of from 0.5 to 3.0:1.

3. The improvement of claim 2 wherein said catalyst is used in such an amount that the amount of titanium tetrahalide is in the range of from 0.1 to 20 m. moles per mole of isoprene.

4. The improvement of claim 1 wherein said compound having two independent conjugate diene groups is expressed by the general formula:

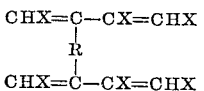

Wherein R represents an aliphatic residue, an alicyclic residue, an aromatic residue or an aromatic aliphatic residue, each having one to 10 carbon atoms, and X represents a hydrogen atom or methyl group.

5. The improvement of claim 1 wherein said compound having two independent conjugate diene groups is expressed by the general formula:

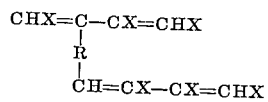

wherein R represents an aliphatic residues an alicyclic residue, an aromatic residue or an aromatic aliphatic residue, each having one to 10 carbon atoms, and X represents a hydrogen atom or methyl group.

6. The improvement of claim 1 wherein said compound having two independent conjugate diene groups is expressed by the general formula:

$$CHX = CX - CX = CH - R - CH = CX - CX = CHX$$

wherein R represents an aliphatic residue, an alicyclic residue, an aromatic residue or an aromatic aliphatic residue, each having one to 10 carbon atoms, and X represents a hydrogen atom or methyl group.

7. The improvement of claim 1 wherein said catalyst further includes a Lewis base selected from non-polymerizable ethers and amines.

8. The improvement of claim 7 wherein said non-polymerizable ethers and amines are selected from aliphatic ethers, aromatic ethers, aliphatic aromatic mixed ethers, alicyclic ethers, primary, secondary and tertiary amines having an alkyl group of less than 18 carbon atoms, primary, secondary and tertiary aryl and aralkyl amines, and heterocyclic amines.

* * * * *